US012175091B2

(12) United States Patent
Seppanen

(10) Patent No.: US 12,175,091 B2
(45) Date of Patent: *Dec. 24, 2024

(54) SUPPORTING A STATELESS CONTROLLER IN A STORAGE SYSTEM

(71) Applicant: PURE STORAGE, INC., Mountain View, CA (US)

(72) Inventor: Eric D. Seppanen, Mountain View, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,948

(22) Filed: Jun. 21, 2022

(65) Prior Publication Data

US 2022/0317894 A1 Oct. 6, 2022

Related U.S. Application Data

(63) Continuation of application No. 16/369,258, filed on Mar. 29, 2019, now Pat. No. 11,385,801, which is a (Continued)

(51) Int. Cl.
*G06F 3/00* (2006.01)
*G06F 3/06* (2006.01)

(52) U.S. Cl.
CPC .......... *G06F 3/0619* (2013.01); *G06F 3/0611* (2013.01); *G06F 3/0658* (2013.01); (Continued)

(58) Field of Classification Search
CPC .... G06F 3/0619; G06F 3/0611; G06F 3/0658; G06F 3/0659; G06F 3/0665; G06F 3/0688; G06F 3/0689
See application file for complete search history.

(56) References Cited

U.S. PATENT DOCUMENTS 5,706,210 A 1/1998 Kumano et al.
5,799,200 A 8/1998 Brant et al.
(Continued)

FOREIGN PATENT DOCUMENTS

CN 104461727 A 3/2015
EP 0725324 A2 8/1996
(Continued)

OTHER PUBLICATIONS

Bellamy-McIntyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.
(Continued)

*Primary Examiner* — Reginald G Bragdon
*Assistant Examiner* — Michael L Westbrook

(57) ABSTRACT

Supporting a stateless controller in a storage system, including: sending, from a storage system controller to a storage device, a request for one or more locations of control information for the storage device, the storage system controller being external to the storage device; receiving, from the storage device, the one or more locations of one or more memory blocks that include the control information; and retrieving, from the storage device, the control information from the one or more memory blocks.

20 Claims, 7 Drawing Sheets

Related U.S. Application Data continuation of application No. 14/789,421, filed on Jul. 1, 2015, now Pat. No. 10,296,236.

(52) U.S. Cl.
CPC .......... *G06F 3/0659* (2013.01); *G06F 3/0665* (2013.01); *G06F 3/0688* (2013.01); *G06F 3/0689* (2013.01)

(56) References Cited

U.S. PATENT DOCUMENTS

| | | | |
|---|---|---|---|
| 5,933,598 | A | 8/1999 | Scales et al. |
| 6,012,032 | A | 1/2000 | Donovan et al. |
| 6,085,333 | A | 7/2000 | Dekoning et al. |
| 6,591,328 | B1 | 7/2003 | Iida et al. |
| 6,643,641 | B1 | 11/2003 | Snyder |
| 6,647,514 | B1 | 11/2003 | Umberger et al. |
| 6,789,162 | B1 | 9/2004 | Talagala et al. |
| 7,089,272 | B1 | 8/2006 | Garthwaite et al. |
| 7,107,389 | B2 | 9/2006 | Inagaki et al. |
| 7,146,521 | B1 | 12/2006 | Nguyen |
| 7,334,124 | B2 | 2/2008 | Pham et al. |
| 7,437,530 | B1 | 10/2008 | Rajan |
| 7,493,424 | B1 | 2/2009 | Bali et al. |
| 7,669,029 | B1 | 2/2010 | Mishra et al. |
| 7,689,609 | B2 | 3/2010 | Lango et al. |
| 7,743,191 | B1 | 6/2010 | Liao |
| 7,899,780 | B1 | 3/2011 | Shmuylovich et al. |
| 8,042,163 | B1 | 10/2011 | Karr et al. |
| 8,086,585 | B1 | 12/2011 | Brashers et al. |
| 8,200,887 | B2 | 6/2012 | Bennett |
| 8,271,700 | B1 | 9/2012 | Annem et al. |
| 8,387,136 | B2 | 2/2013 | Lee et al. |
| 8,437,189 | B1 | 5/2013 | Montierth et al. |
| 8,465,332 | B2 | 6/2013 | Hogan et al. |
| 8,527,544 | B1 | 9/2013 | Colgrove et al. |
| 8,566,546 | B1 | 10/2013 | Marshak et al. |
| 8,578,442 | B1 | 11/2013 | Banerjee |
| 8,613,066 | B1 | 12/2013 | Brezinski et al. |
| 8,620,970 | B2 | 12/2013 | English et al. |
| 8,751,463 | B1 | 6/2014 | Chamness |
| 8,762,642 | B2 | 6/2014 | Bates et al. |
| 8,769,622 | B2 | 7/2014 | Chang et al. |
| 8,800,009 | B1 | 8/2014 | Beda et al. |
| 8,812,860 | B1 | 8/2014 | Bray |
| 8,850,546 | B1 | 9/2014 | Field et al. |
| 8,898,346 | B1 | 11/2014 | Simmons |
| 8,909,854 | B2 | 12/2014 | Yamagishi et al. |
| 8,931,041 | B1 | 1/2015 | Banerjee |
| 8,949,863 | B1 | 2/2015 | Coatney et al. |
| 8,984,602 | B1 | 3/2015 | Bailey et al. |
| 8,990,905 | B1 | 3/2015 | Bailey et al. |
| 9,081,713 | B1 | 7/2015 | Bennett |
| 9,124,569 | B2 | 9/2015 | Hussain et al. |
| 9,134,922 | B2 | 9/2015 | Rajagopal et al. |
| 9,189,334 | B2 | 11/2015 | Bennett |
| 9,209,973 | B2 | 12/2015 | Aikas et al. |
| 9,250,823 | B1 | 2/2016 | Kamat et al. |
| 9,300,660 | B1 | 3/2016 | Borowiec et al. |
| 9,311,182 | B2 | 4/2016 | Bennett |
| 9,444,822 | B1 | 9/2016 | Borowiec et al. |
| 9,507,532 | B1 | 11/2016 | Colgrove et al. |
| 9,632,870 | B2 | 4/2017 | Bennett |
| 9,836,224 | B2 * | 12/2017 | Seo ................... G06F 11/1076 |
| 10,296,236 | B2 | 5/2019 | Seppanen |
| 11,385,801 | B1 | 7/2022 | Seppanen |
| 2002/0013802 | A1 | 1/2002 | Mori et al. |
| 2003/0065866 | A1 | 4/2003 | Spencer |
| 2003/0145172 | A1 | 7/2003 | Galbraith et al. |
| 2003/0191783 | A1 | 10/2003 | Wolczko et al. |
| 2003/0225961 | A1 | 12/2003 | Chow et al. |
| 2004/0080985 | A1 | 4/2004 | Chang et al. |
| 2004/0111573 | A1 | 6/2004 | Garthwaite |
| 2004/0153844 | A1 | 8/2004 | Ghose et al. |
| 2004/0193814 | A1 | 9/2004 | Erickson et al. |
| 2004/0260967 | A1 | 12/2004 | Guha et al. |
| 2005/0160416 | A1 | 7/2005 | Jamison et al. |
| 2005/0188246 | A1 | 8/2005 | Emberty et al. |
| 2005/0216800 | A1 | 9/2005 | Bicknell et al. |
| 2006/0015771 | A1 | 1/2006 | Van Gundy et al. |
| 2006/0129817 | A1 | 6/2006 | Borneman et al. |
| 2006/0161726 | A1 | 7/2006 | Lasser |
| 2006/0230245 | A1 | 10/2006 | Gounares et al. |
| 2006/0239075 | A1 | 10/2006 | Williams et al. |
| 2007/0022227 | A1 | 1/2007 | Miki |
| 2007/0028068 | A1 | 2/2007 | Golding et al. |
| 2007/0055702 | A1 | 3/2007 | Fridella et al. |
| 2007/0109856 | A1 | 5/2007 | Pellicone et al. |
| 2007/0150689 | A1 | 6/2007 | Pandit et al. |
| 2007/0168321 | A1 | 7/2007 | Saito et al. |
| 2007/0220227 | A1 | 9/2007 | Long |
| 2007/0294563 | A1 | 12/2007 | Bose |
| 2007/0294564 | A1 | 12/2007 | Reddin et al. |
| 2008/0005587 | A1 | 1/2008 | Ahlquist |
| 2008/0077825 | A1 | 3/2008 | Bello et al. |
| 2008/0162674 | A1 | 7/2008 | Dahiya |
| 2008/0195833 | A1 | 8/2008 | Park |
| 2008/0270678 | A1 | 10/2008 | Cornwell et al. |
| 2008/0282045 | A1 | 11/2008 | Biswas et al. |
| 2009/0077340 | A1 | 3/2009 | Johnson et al. |
| 2009/0100115 | A1 | 4/2009 | Park et al. |
| 2009/0198889 | A1 | 8/2009 | Ito et al. |
| 2009/0327591 | A1 | 12/2009 | Moshayedi |
| 2010/0052625 | A1 | 3/2010 | Cagno et al. |
| 2010/0211723 | A1 | 8/2010 | Mukaida |
| 2010/0246266 | A1 | 9/2010 | Park et al. |
| 2010/0250826 | A1 | 9/2010 | Jeddeloh |
| 2010/0257142 | A1 | 10/2010 | Murphy et al. |
| 2010/0262764 | A1 | 10/2010 | Liu et al. |
| 2010/0325345 | A1 | 12/2010 | Ohno et al. |
| 2010/0332754 | A1 | 12/2010 | Lai et al. |
| 2011/0072290 | A1 | 3/2011 | Davis et al. |
| 2011/0125955 | A1 | 5/2011 | Chen |
| 2011/0131231 | A1 | 6/2011 | Haas et al. |
| 2011/0167221 | A1 | 7/2011 | Pangal et al. |
| 2012/0023144 | A1 | 1/2012 | Rub |
| 2012/0054264 | A1 | 3/2012 | Haugh et al. |
| 2012/0079318 | A1 | 3/2012 | Colgrove et al. |
| 2012/0131253 | A1 | 5/2012 | McKnight et al. |
| 2012/0303919 | A1 | 11/2012 | Hu et al. |
| 2012/0311000 | A1 | 12/2012 | Post et al. |
| 2013/0007845 | A1 | 1/2013 | Chang et al. |
| 2013/0031414 | A1 | 1/2013 | Dhuse et al. |
| 2013/0036272 | A1 | 2/2013 | Nelson |
| 2013/0067152 | A1 * | 3/2013 | Yamamoto ............ G06F 3/0608 |
| | | | 711/E12.008 |
| 2013/0071087 | A1 | 3/2013 | Motiwala et al. |
| 2013/0145447 | A1 | 6/2013 | Maron |
| 2013/0191555 | A1 | 7/2013 | Liu |
| 2013/0198459 | A1 | 8/2013 | Joshi et al. |
| 2013/0205173 | A1 | 8/2013 | Yoneda |
| 2013/0212319 | A1 | 8/2013 | Hida et al. |
| 2013/0219164 | A1 | 8/2013 | Hamid |
| 2013/0227201 | A1 | 8/2013 | Talagala et al. |
| 2013/0290607 | A1 | 10/2013 | Chang et al. |
| 2013/0311434 | A1 | 11/2013 | Jones |
| 2013/0318297 | A1 | 11/2013 | Jibbe et al. |
| 2013/0332614 | A1 | 12/2013 | Brunk et al. |
| 2014/0020083 | A1 | 1/2014 | Fetik |
| 2014/0074850 | A1 | 3/2014 | Noel et al. |
| 2014/0082715 | A1 | 3/2014 | Grajek et al. |
| 2014/0086146 | A1 | 3/2014 | Kim et al. |
| 2014/0090009 | A1 | 3/2014 | Li et al. |
| 2014/0096220 | A1 | 4/2014 | Pinto et al. |
| 2014/0101434 | A1 | 4/2014 | Senthurpandi et al. |
| 2014/0164774 | A1 | 6/2014 | Nord et al. |
| 2014/0173232 | A1 | 6/2014 | Reohr et al. |
| 2014/0195636 | A1 | 7/2014 | Karve et al. |
| 2014/0201512 | A1 | 7/2014 | Seethaler et al. |
| 2014/0201541 | A1 | 7/2014 | Paul et al. |
| 2014/0208155 | A1 | 7/2014 | Pan |
| 2014/0215590 | A1 | 7/2014 | Brand |
| 2014/0229654 | A1 | 8/2014 | Goss et al. |
| 2014/0230017 | A1 | 8/2014 | Saib |

(56) References Cited

U.S. PATENT DOCUMENTS

| | | |
|---|---|---|
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0006816 A1 | 1/2015 | Gong |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0371063 A1* | 12/2015 | Van Antwerpen ....... G09C 1/00 713/190 |
| 2015/0378888 A1 | 12/2015 | Zhang et al. |
| 2016/0098323 A1 | 4/2016 | Mutha et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2018/0081562 A1 | 3/2018 | Vasudevan |

FOREIGN PATENT DOCUMENTS

| | | | |
|---|---|---|---|
| EP | 1559016 A1 | 8/2005 | |
| EP | 3035193 A1 | 6/2016 | |
| WO | 2004040458 A1 | 5/2004 | |
| WO | 2012087648 A2 | 6/2012 | |
| WO | 2013071087 A1 | 5/2013 | |
| WO | 2014110137 A1 | 7/2014 | |
| WO | 2016015008 A1 | 1/2016 | |
| WO | 2016190938 A1 | 12/2016 | |
| WO | 2016195759 A1 | 12/2016 | |
| WO | 2016195958 A1 | 12/2016 | |
| WO | 2016195961 A1 | 12/2016 | |

OTHER PUBLICATIONS

ETSI, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dictzip file format", GitHub.com (online), accessed Jul. 28, 2015, 1 page, URL: github.com/fidlej/idzip.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, Apr. 29, 2016, 12 pages.

International Search Report and Written Opinion, PCT/US2016/015008, May 4, 2016, 12 pages.

International Search Report and Written Opinion, PCT/US2016/016333, Jun. 8, 2016, 12 pages.

International Search Report and Written Opinion, PCT/US2016/020410, Jul. 8, 2016, 12 pages.

International Search Report and Written Opinion, PCT/US2016/032052, Aug. 30, 2016, 17 pages.

International Search Report and Written Opinion, PCT/US2016/032084, Jul. 18, 2016, 12 pages.

International Search Report and Written Opinion, PCT/US2016/035492, Aug. 17, 2016, 10 pages.

International Search Report and Written Opinion, PCT/US2016/036693, Aug. 29, 2016, 10 pages.

International Search Report and Written Opinion, PCT/US2016/038758, Oct. 7, 2016, 10 pages.

International Search Report and Written Opinion, PCT/US2016/040393, Sep. 22, 2016, 10 pages.

International Search Report and Written Opinion, PCT/US2016/044020, Sep. 30, 2016, 11 pages.

International Search Report and Written Opinion, PCT/US2016/044874, Oct. 7, 2016, 11 pages.

International Search Report and Written Opinion, PCT/US2016/044875, Oct. 5, 2016, 13 pages.

International Search Report and Written Opinion, PCT/US2016/044876, Oct. 21, 2016, 12 pages.

International Search Report and Written Opinion, PCT/US2016/044877, Sep. 29, 2016, 13 pages.

Kong, "Using PCI Express as the Primary System Interconnect in Multiroot Compute, Storage, Communications and Embedded Systems", White Paper, IDT.com (online), Aug. 28, 2008, 12 pages, URL: www.idt.com/document/whp/idt-pcie-multi-root-white-paper.

Li et al., "Access Control for the Services Oriented Architecture", Proceedings of the 2007 ACM Workshop on Secure Web Services (SWS '07), Nov. 2007, pp. 9-17, ACM New York, NY.

Microsoft, "Hybrid for SharePoint Server 2013—Security Reference Architecture", Microsoft (online), Oct. 2014, 53 pages, URL: hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Microsoft, "Hybrid Identity", Microsoft (online), Apr. 2014, 36 pages, URL: www.aka.ms/HybridIdentityWp.

PCMAG, "Storage Array Definition", Published May 10, 2013, URL: http://web.archive.org/web/20130510121646/http://www.pcmag.com/encyclopedia/term/52091/storage-array, 2 pages.

Storer et al., "Secure Data Deduplication", Proceedings of the 4th ACM International Workshop on Storage Security and Survivability (StorageSS'08), Oct. 2008, 10 pages, ACM New York, NY. USA, DOI: 10.1145/1456469.1456471.

Sweere, "Creating Storage Class Persistent Memory with NVDIMM", Published in Aug. 2013, Flash Memory Summit 2013, URL: http://ww.flashmemorysummit.com/English/Collaterals/Proceedings/2013/20130814_T2_Sweere.pdf, 22 pages.

Techopedia, "What is a disk array", techopedia.com (online), Jan. 13, 2012, 1 page, URL: web.archive.org/web/20120113053358/http://www.techopedia.com/definition/1009/disk-array.

Webopedia, "What is a disk array", webopedia.com (online), May 26, 2011, 2 pages, URL: web/archive.org/web/20110526081214/http://www.webopedia.com/TERM/D/disk_array.html.

Wikipedia, "Convergent Encryption", Wikipedia.org (online), accessed Sep. 8, 2015, 2 pages, URL: en.wikipedia.org/wiki/Convergent_encryption.

Extended European Search Report for European Application No. 21180802.7, mailed Jan. 4, 2022, 11 Pages.

Extended European Search Report for European Application No. 24151208.6, mailed Mar. 25, 2024, 141 Pages.

* cited by examiner

SUPPORTING A STATELESS CONTROLLER IN A STORAGE SYSTEM

CROSS-REFERENCE TO RELATED APPLICATIONS

This is a continuation application for patent entitled to a filing date and claiming the benefit of earlier-filed U.S. patent application Ser. No. 16/369,258, filed Mar. 29, 2019, herein incorporated by reference in its entirety, which is a continuation of U.S. Pat. No. 10,296,236, issued May 21, 2019.

BACKGROUND

Field of Technology

The field of technology is methods, apparatuses, and products for offloading device management responsibilities from a storage device in an array of storage devices.

Description of Related Art

Enterprise storage systems can provide large amounts of computer storage to modern enterprises. Such computer storage can be embodied as a plurality of storage devices such as hard disk drives ('HDDs'), solid-state drives ('SSDs'), and so on. The performance of such enterprise storage systems may be negatively impacted as the storage devices are tasked with functions other than reading data and writing data. For example, the performance of such enterprise storage systems may be negatively impacted as the storage devices are tasked with performing garbage collection operations or other device management operations. As such, the storage devices may be utilizing a finite set of resources to perform device management operations that may vary at different points in time, thereby leading to users of the enterprise storage system to experience inconsistent performance at different points in time.

SUMMARY

Methods, apparatuses, and products for offloading device management responsibilities from a storage device in an array of storage devices are disclosed. In some embodiments, offloading device management responsibilities from a storage device in an array of storage devices can include: retrieving, from the storage device, control information describing the state of one or more memory blocks in the storage device and performing, in dependence upon the control information, a storage device management operation.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
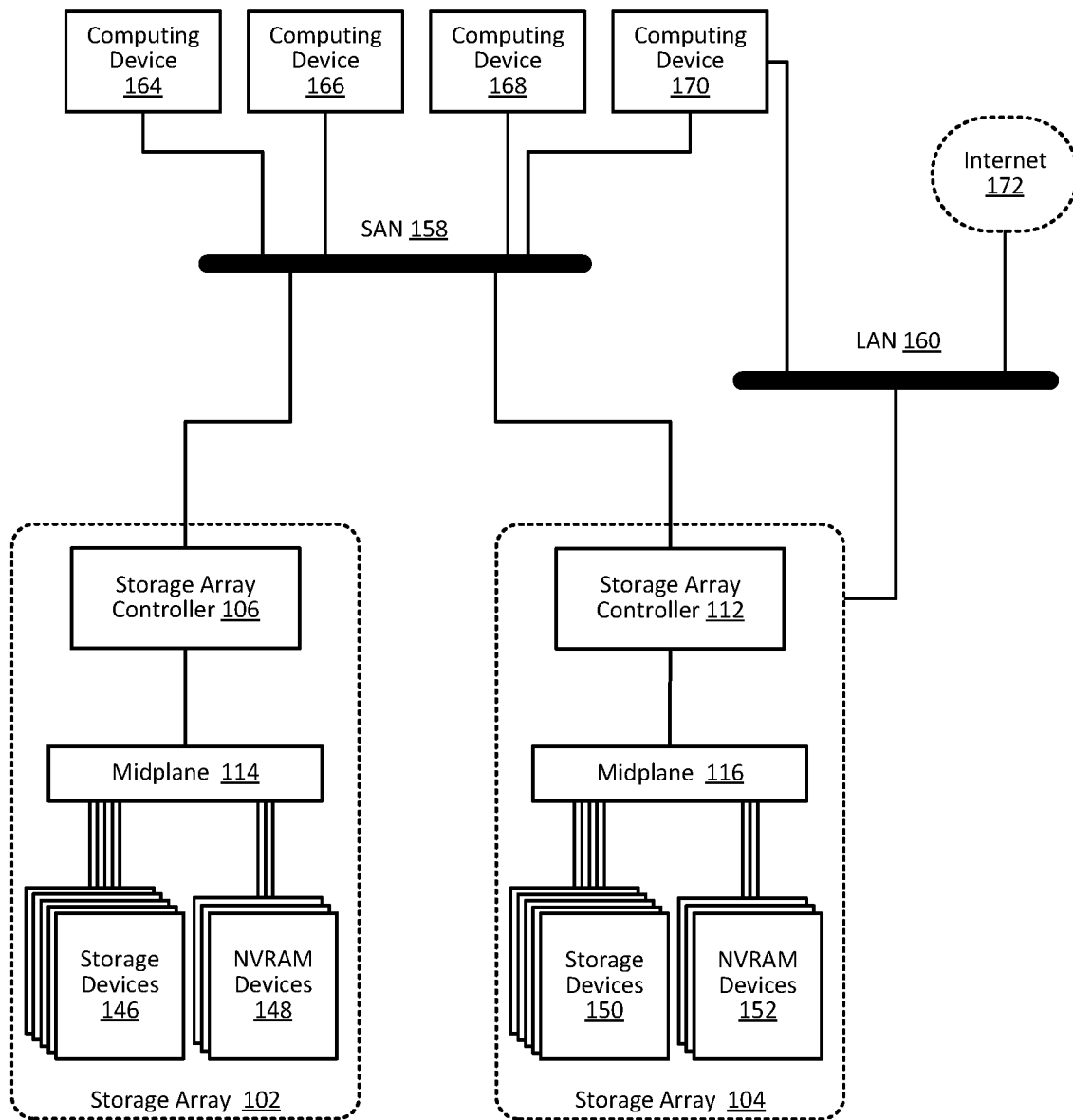
FIG. 1 sets forth a block diagram of a system configured for offloading device management responsibilities from a storage device in an array of storage devices according to embodiments of the present invention.

Example methods, apparatuses, and products for offloading device management responsibilities from a storage device in an array of storage devices in accordance with the present invention are described with reference to the accompanying drawings, beginning with FIG. 1. FIG. 1 sets forth a block diagram of a system configured for offloading device management responsibilities from a storage device in an array of storage devices according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to one or more storage arrays (102, 104) through a storage area network ('SAN') (158) as well as a local area network ('LAN') (160). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one of many possible data communications couplings which may be implemented between a computing device (164, 166, 168, 170) and a storage array (102, 104), and readers will further appreciate that any other data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), and others as will occur to those of skill in the art.

The example storage arrays (102, 104) of FIG. 1 provide persistent data storage for the computing devices (164, 166, 168, 170). Each storage array (102, 104) depicted in FIG. 1 includes a plurality of storage array controllers (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing Redundant Array of Independent Drives ('RAID') or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of non-volatile Random Access Memory ('NVRAM') devices (148, 152).

Each NVRAM device (148, 152) may be configured to receive, from the storage array controller (106, 112), data to be stored in the storage devices (146). Such data may originate from any one of the computing devices (164, 166, 168, 170). In the example of FIG. 1, writing data to the NVRAM device may be carried out more quickly than writing data to the storage device. The storage array controller (106, 112) may be configured to effectively utilize the NVRAM devices (148, 152) as a quickly accessible buffer for data destined to be written to the storage devices. In this way, the latency for write requests may be significantly improved relative to a system in which the storage array controller writes data directly to the storage devices (146, 150).

The NVRAM devices may be implemented with computer memory in the form of high bandwidth, low latency RAM. In such an embodiment, each NVRAM device is referred to as 'non-volatile' because each NVRAM device may receive or include a unique power source that maintains the state of the RAM after main power loss to the NVRAM device (148, 152). Such a power source may be a battery, one or more capacitors, or the like. During the power loss, the NVRAM device (148, 152) may be configured to write the contents of the RAM to a persistent storage, such as the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives ("Flash drives"), and the like.

The storage array controllers (106, 112) of FIG. 1 may be configured for offloading device management responsibilities from a storage device in an array of storage devices according to embodiments of the present invention. In the example depicted in FIG. 1, the control information can describe the state of one or more memory blocks in the storage device (146, 150). The control information may indicate, for example, that a particular memory block has failed and should no longer be written to, that a particular memory block contains boot code for a storage array controller (106, 112), the number of program-erase ('P/E') cycles that have been performed on a particular memory block, the age of data stored in a particular memory block, the type of data that is stored in a particular memory block, and so on.

In the example depicted in FIG. 1, the control information for the storage device (146, 150) may be stored in one or more particular memory blocks of the storage device (146, 150) that are selected by the storage array controller (106, 112). The selected memory blocks may be tagged with a special identifier indicating that the selected memory block contains control information. The special identifier may be utilized by the storage device (146, 150) to quickly identify those memory blocks that contain control information, for example, by the storage device (146, 150) issuing a special command to locate memory blocks that contain control information. Readers will further appreciate that the control information may be so large that segments of the control information may be stored in multiple locations, the control information may be stored in multiple locations for redundancy purposes, or the control information may otherwise be distributed across multiple memory blocks in the storage device (146, 150).

The storage array controllers (106, 112) may offload device management responsibilities from a storage device (146, 150) in an array (102, 104) of storage devices by retrieving, from the storage device (146, 150), control information describing the state of one or more memory blocks in the storage device (146, 150). Retrieving the control information from the storage device (146, 150) may be carried out, for example, by the storage array controller (106, 112) querying the storage device (146, 150) for the location of control information for the storage device. In such an example, the storage device (146, 150) may be configured to execute special purpose instructions that enable the storage device (146, 150) to identify the location of the control information. Such special purpose instructions may be executed by a controller on the storage device (146, 150) and may cause the storage device (146, 150) to scan a portion of each memory block to identify those memory blocks that house control information for the storage device (146, 150). The storage device (146, 150) may subsequently send a response message to the storage array controller (106, 112) that includes the location of control information for the storage device (146, 150). As such, the storage array controller (106, 112) may subsequently issue a request to read data stored at the address associated with the location of control information for the storage device (146, 150).

The storage array controllers (106, 112) may further offload device management responsibilities from a storage device (146, 150) in an array (102, 104) of storage devices by performing, in dependence upon the control information, a storage device management operation. A storage device management operation may be embodied, for example, as an operation that is typically performed by the storage device (146, 150) itself. Such a storage device management operation can include, for example, ensuring that data is not written to failed memory blocks within the storage device (146, 150), ensuring that data is written to memory blocks within the storage device (146, 150) in such a way that adequate wear leveling is achieved, and so on. Readers will appreciate that by having the storage array controller (106, 112) perform storage device management operations, the burden of performing such storage device management operations can be offloaded from the storage device (146, 150), so that the storage device (146, 150) can dedicate more of its resources to reading data from and writing data to the storage device (146, 150).

The arrangement of computing devices, storage arrays, networks, and other devices making up the example system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Offloading device management responsibilities from a storage device in an array of storage devices in accordance with embodiments of the present invention is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful for offloading device management responsibilities from a storage device in an array of storage devices according to embodiments of the present invention.

Figure 2:
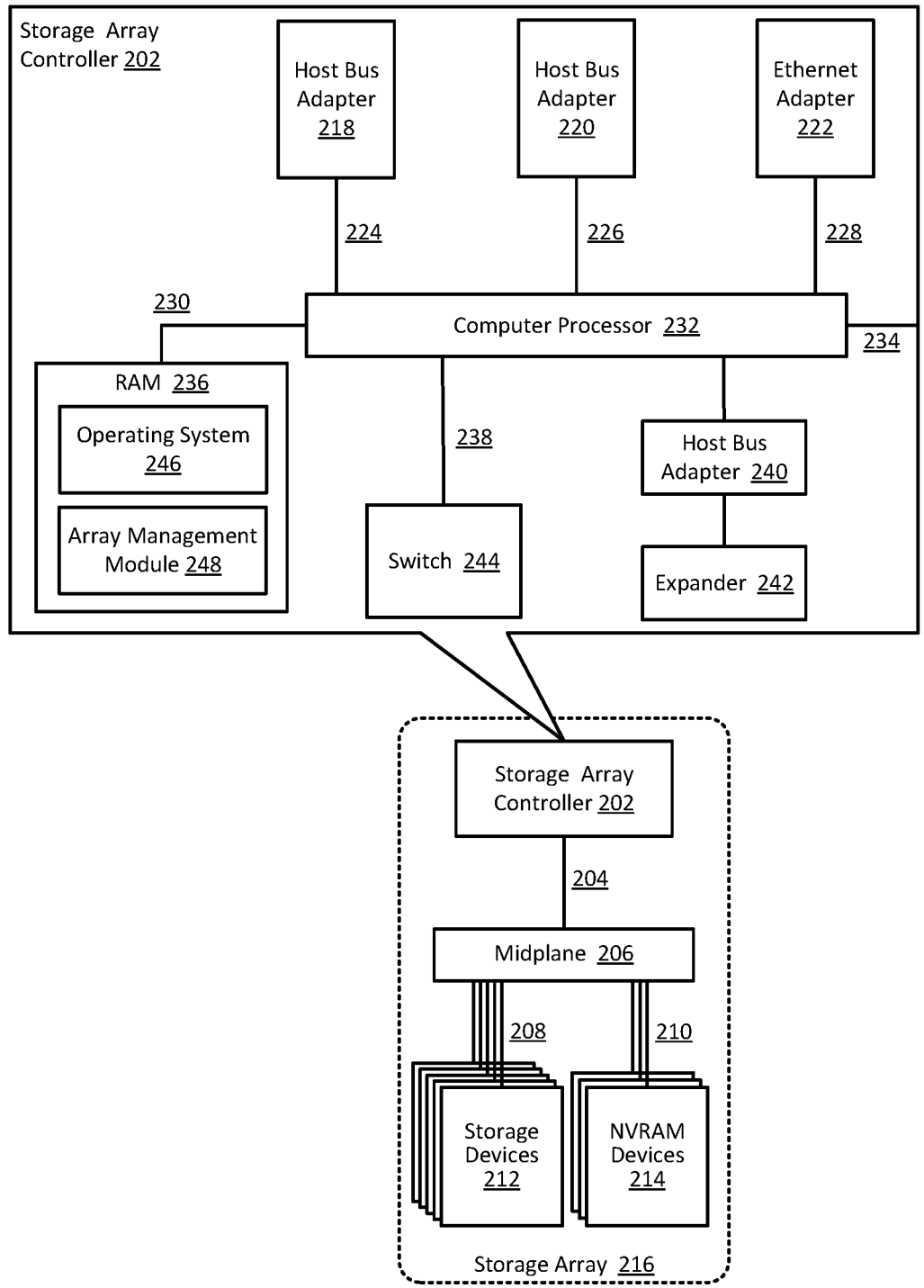
FIG. 2 sets forth a block diagram of an example storage array controller useful in offloading device management responsibilities from a storage device in an array of storage devices according to embodiments of the present invention.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more NVRAM devices (214) that are included as part of a storage array (216). The storage array controller (202) may be coupled to the midplane (206) via one or more data communications links (204) and the midplane (206) may be coupled to the storage devices (212) and the NVRAM devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for offloading device management responsibilities from a storage device in an array of storage devices according to embodiments of the present invention include UNIX™, Linux™, Microsoft Windows™, and others as will occur to those of skill in the art. Also stored in RAM (236) is an array management module (248), a module of computer program instructions for offloading device management responsibilities from a storage device in an array of storage devices according to embodiments of the present invention. The array management module (248) may be configured to perform steps such as retrieving, from the storage device, control information describing the state of one or more memory blocks in the storage device, performing, in dependence upon the control information, a storage device management operation, and other steps that will be described in greater detail below as being performed by the storage array controller generally. Readers will appreciate that while the array management module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect.

Readers will recognize that these components, protocols, adapters, and architectures are for illustration only, not limitation. Such a storage array controller may be implemented in a variety of different ways, each of which is well within the scope of the present invention.

Figure 3:
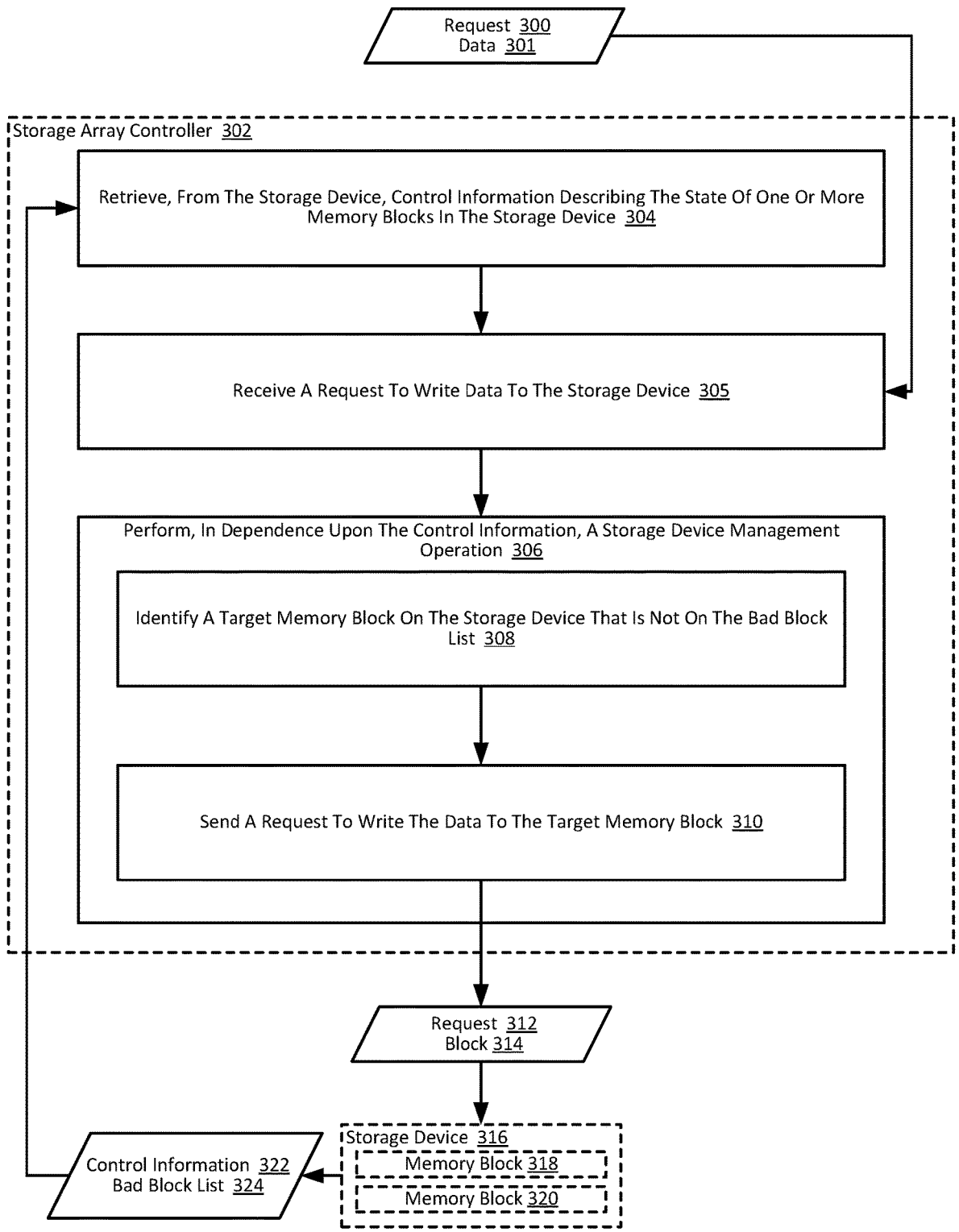
FIG. 3 sets forth a flow chart illustrating an example method for offloading device management responsibilities from a storage device in an array of storage devices according to embodiments of the present invention.

For further explanation, FIG. 3 sets forth a flow chart illustrating an example method for offloading device management responsibilities from a storage device in an array of storage devices according to embodiments of the present invention. The example method depicted in FIG. 3 includes retrieving (304), from the storage device (316), control information (322) describing the state of one or more memory blocks (318, 320) in the storage device (316). The control information (322) describing the state of one or more memory blocks (318, 320) in the storage device (316) may indicate, for example, that a particular memory block has failed and should no longer be written to, that a particular memory block contains boot code for the storage array controller (302), the number of P/E cycles that have been performed on a particular memory block, the age of data stored in a particular memory block, the type of data that is stored in a particular memory block, and so on.

The control information (322) describing the state of one or more memory blocks (318, 320) in the storage device (316) may be stored in a dynamically selected memory block (318, 320) of the storage device (316). The selected memory block (318, 320) may be tagged with a special identifier indicating that the selected memory block (318, 320) contains control information. For example, the special identifier indicating that the selected memory block (318, 320) contains control information may be stored in a header associated with the selected memory block (318, 320) that is reserved for storing metadata associated with the selected memory block (318, 320).

Retrieving (304) the control information (322) from the storage device (316) may be carried out, for example, by the storage array controller (302) querying the storage device (316) for the location of control information for the storage device. In such an example, the storage device (316) may be configured to execute special purpose instructions that enable the storage device (316) to identify the location of control information (322). Such special purpose instructions may be executed by a controller on the storage device (316) and may cause the storage device (316) to scan a portion of each memory block (e.g., the header described above) to identify those memory blocks that house control information for the storage device (316). The storage device (316) may subsequently send a response message to the storage array controller (302) that includes the location of control information (322) for the storage device (316). As such, the storage array controller (302) may subsequently issue a request to read data stored at the address associated with the location of control information (322) for the storage device (316), thereby retrieving (304) the control information (322) from the storage device (316).

The example method depicted in FIG. 3 also includes performing (306), in dependence upon the control information (322), a storage device management operation. A storage device management operation may be embodied, for example, as an operation that is typically performed by the storage device (316) itself. Such a storage device management operation can include, for example, ensuring that data is not written to failed memory blocks (318, 320) within the storage device (316), ensuring that data is written to memory blocks (318, 320) within the storage device (316) in such a way that adequate wear leveling is achieved, and so on. Readers will appreciate that by having the storage array controller (302) perform (306) storage device management operations, the burden of performing such storage device management operations can be offloaded from the storage device (316), so that the storage device (316) can dedicate more of its resources to reading data from and writing data to the storage device (316).

In the example method depicted in FIG. 3, the control information (322) includes a bad block list (324). The bad block list (324) of FIG. 3 includes information describing memory blocks on the storage device (316) that have failed. In such an example, an attempt to write data to a block that has failed should not be made and, if possible, data that was contained in the failed blocks should be recreated through the use of error correction codes or other appropriate measures so that the data that was contained in the failed blocks can be relocated to a functioning block in the storage device (316).

The example method depicted in FIG. 3 also includes receiving (305) a request (300) to write data (301) to the storage device (316). The request (300) to write data (301) to the storage device (316) may be received from a host that has access to the storage array, such as the computing devices (164, 166, 168, 170 of FIG. 1) described above with reference to FIG. 1. The request (300) to write data may include the data (301) itself, a logical address where the data (301) is to be written to, and so on.

In the example method depicted in FIG. 3, performing (306) the storage device management operation can include identifying (308) a target memory block on the storage device (316) that is not on the bad block list (324) and sending (310) a request (312) to write the data (301) to the target memory block (314). Identifying (308) a target memory block on the storage device (316) that is not on the bad block list (324) may be carried, for example, by the storage array controller (302) identifying all free memory blocks in the storage device (316) (e.g., memory blocks that do not currently contain data) and determining whether any of the free memory blocks in the storage device (316) are not contained on the bad block list (324). In such an example, a memory block that is free and also not contained on the bad block list (324) may be identified (308) as the target memory block for writing the data (301) associated with the request (300) to write data (301) to the storage device (316). As such, a request (312) may be sent (310) from the storage array controller (302) to the storage device (316) requesting that the storage device (316) write the data (301) to the target memory block (314) identified (308) by the storage array controller (302).

Figure 4:
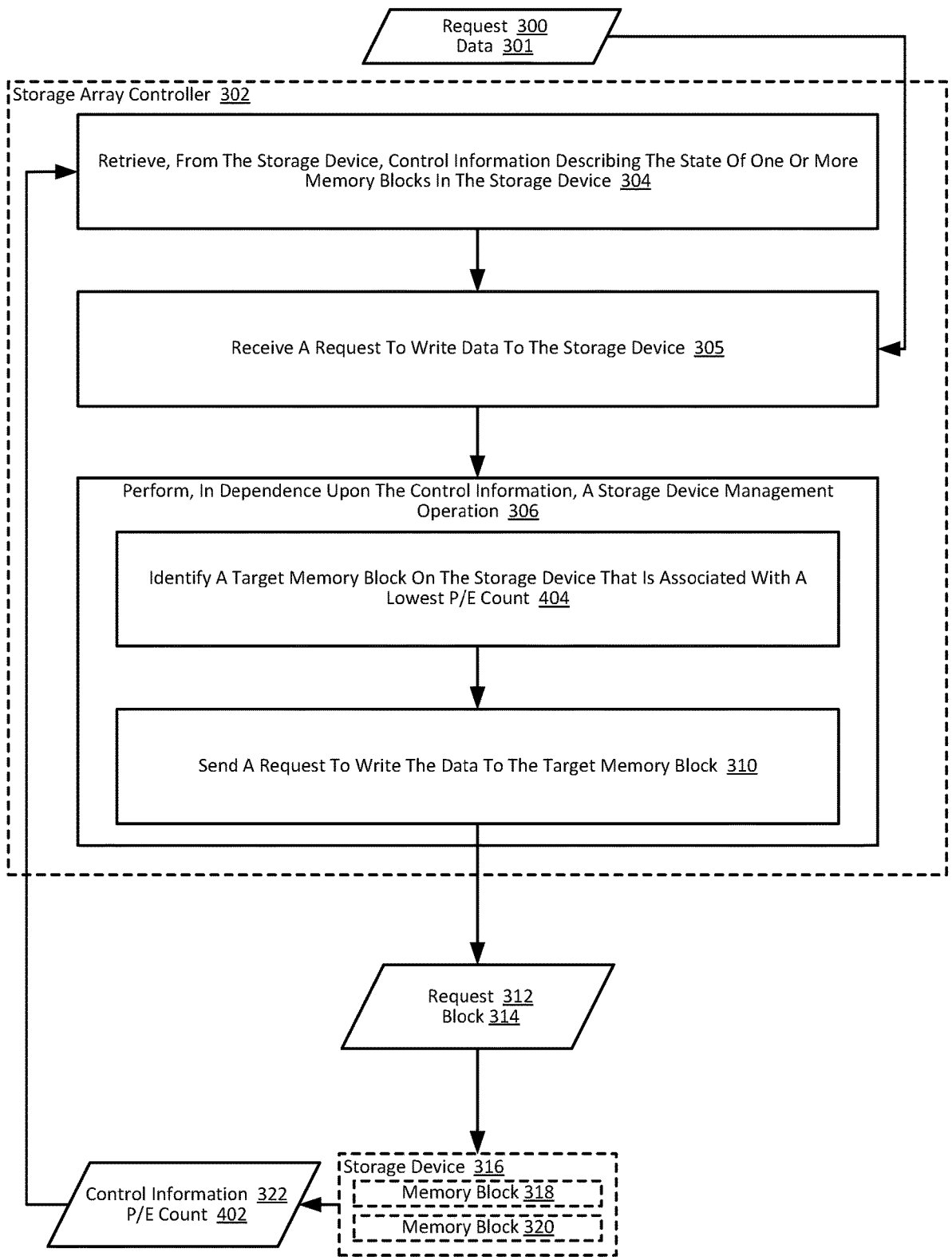
FIG. 4 sets forth a flow chart illustrating an additional example method for offloading device management responsibilities from a storage device in an array of storage devices according to embodiments of the present invention.

For further explanation, FIG. 4 sets forth a flow chart illustrating an example method for offloading device management responsibilities from a storage device (316) in an array of storage devices according to embodiments of the present invention. The example method depicted in FIG. 4 is similar to the example method depicted in FIG. 3, as the example method depicted in FIG. 4 also includes retrieving (304) control information (322) describing the state of one or more memory blocks (318, 320) in the storage device (316), receiving (305) a request (300) to write data (301) to the storage device (316), and performing (306) a storage device management operation.

In the example method depicted in FIG. 4, the control information (322) includes a P/E count (402) for each memory block. The P/E count (402) includes information describing a number of times that data has been written to and erased from a particular memory block. Readers will appreciate that each memory block (318, 320) in the storage device (316) may be written to and erased only a finite number of times. As such, in order to prolong the service life of the storage device (316), wear leveling techniques may be implemented to ensure that each memory block (318, 320) in the storage device (316) is written to and erased a relatively equal number of times. As such, the P/E count (402) for each memory block (318, 320) in the storage device (316) may be useful to enable the storage array controller (302) to implement a wear leveling policy.

In the example method depicted in FIG. 4, performing (306) the storage device management operation can include identifying (404) a target memory block on the storage device (316) that is associated with a lowest P/E count and sending (310) a request to write the data (301) to the target memory block. Identifying (404) a target memory block on the storage device (316) that is associated with a lowest P/E count may be carried out, for example, by the storage array controller (302) searching the P/E count (402) information that was contained in the control information (322) to identify memory block on the storage device (316) that is associated with a lowest P/E count. Alternatively, after receiving P/E count (402) information that was contained in the control information (322), the storage array controller (302) may maintain P/E counts for each memory block (318, 320) and may search such information to identify (404) the memory block (318, 320) on the storage device (316) that is associated with a lowest P/E count. In such an example, a request (312) may be sent (310) from the storage array controller (302) to the storage device (316) requesting that the storage device (316) write the data (301) to the target memory block (314) identified (404) by the storage array controller (302).

Figure 5:
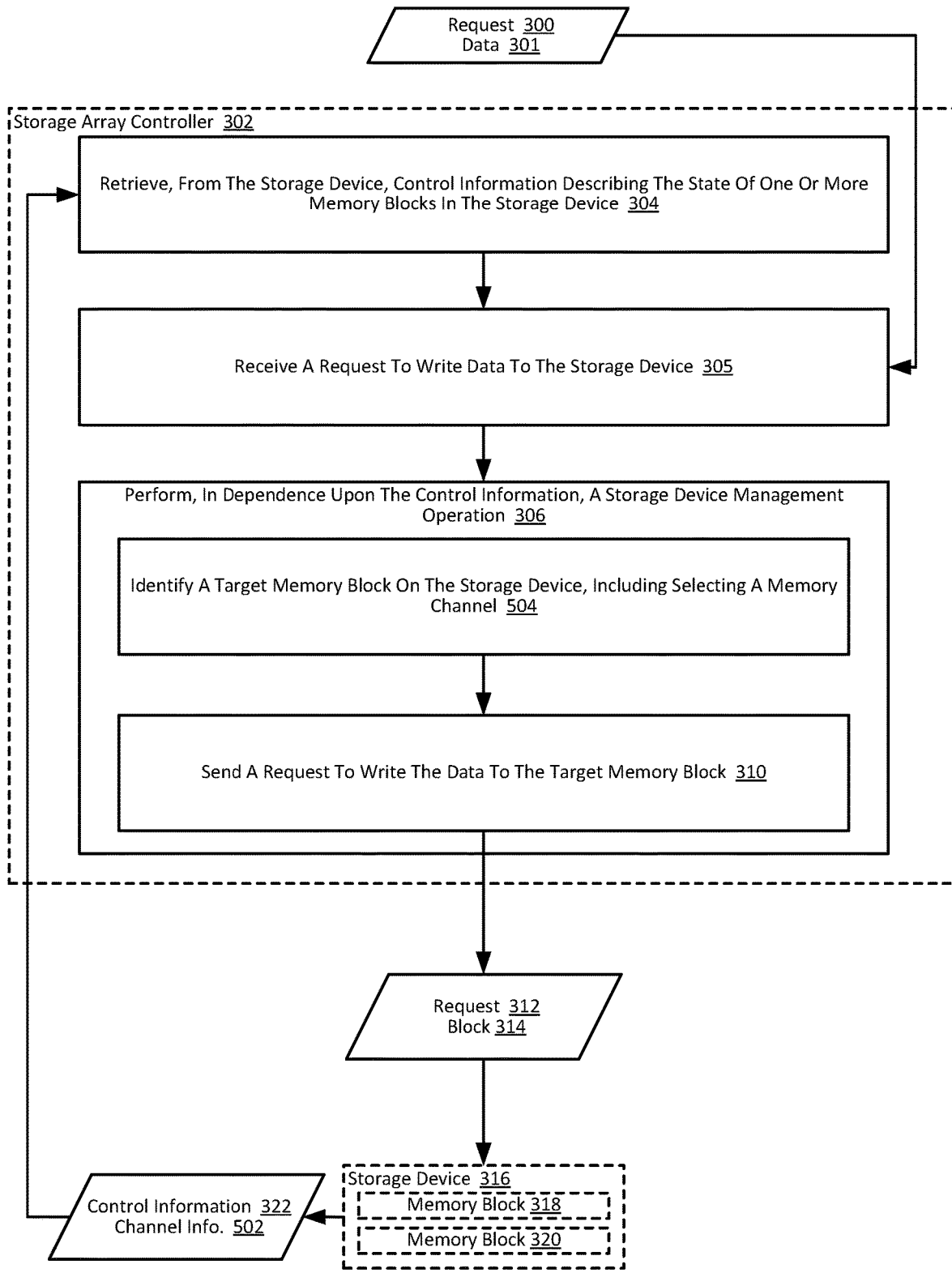
FIG. 5 sets forth a flow chart illustrating an additional example method for offloading device management responsibilities from a storage device in an array of storage devices according to embodiments of the present invention.

For further explanation, FIG. 5 sets forth a flow chart illustrating an example method for offloading device management responsibilities from a storage device (316) in an array of storage devices according to embodiments of the present invention. The example method depicted in FIG. 5 is similar to the example method depicted in FIG. 3, as the example method depicted in FIG. 5 also includes retrieving (304) control information (322) describing the state of one or more memory blocks (318, 320) in the storage device (316), receiving (305) a request (300) to write data (301) to the storage device (316), and performing (306) a storage device management operation.

In the example method depicted in FIG. 5, the control information (322) includes information (502) identifying a plurality of memory access channels and a range of memory addresses associated with each memory access channel. The storage device (316) depicted in FIG. 5 may be accessed via a plurality of memory channels, where each memory channel represents a data communications link between the storage device (316) and a storage array controller (302). Each memory channel may be used to access a range of addresses within the storage device (316). As such, the information (502) identifying a plurality of memory access channels and a range of memory addresses associated with each memory access channel may include an identifier for each memory access channel as well as a range of memory addresses that may be accessed via a particular memory channel.

In the example method depicted in FIG. 5, performing (306) the storage device management operation can include identifying (504) a target memory block on the storage device (316), including selecting a memory channel. Selecting a memory channel may be carried out to facilitate parallel accesses of the storage device (316) as only one data transfer can traverse a particular memory channel at a particular time. In such a way, by utilizing each memory channel simultaneously, multiple data transfers can occur simultaneously so as to reduce the performance penalty (e.g., increased latency) associated with same-channel operations. Selecting a memory channel may be carried out, for example, by selecting a memory channel that is not currently being used to service a memory access request, by selecting the memory channel that was least recently used to service a memory access request, and so on. Once a memory channel has been selected, a memory block that is accessible via the selected memory channel may be identified (504) as the target memory block on the storage device (316) for servicing the request (300) to write data (301) to the storage device (316). A request (312) may therefore be sent (310) from the storage array controller (302) to the storage device (316) via the selected memory channel, requesting that the storage device (316) write the data (301) to the target memory block (314) identified (504) by the storage array controller (302).

Figure 6:
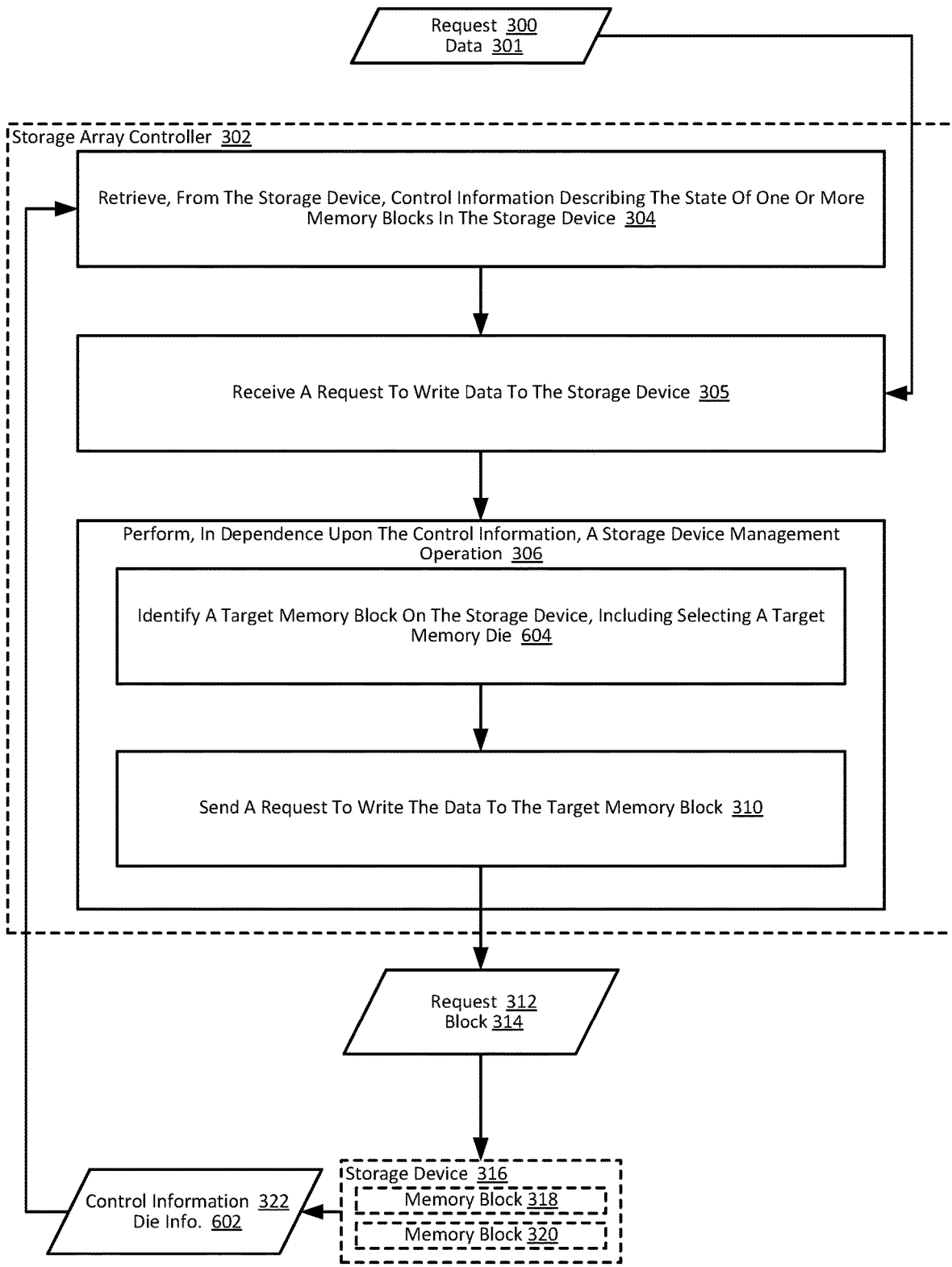
FIG. 6 sets forth a flow chart illustrating an additional example method for offloading device management responsibilities from a storage device in an array of storage devices according to embodiments of the present invention.

For further explanation, FIG. 6 sets forth a flow chart illustrating an example method for offloading device management responsibilities from a storage device (316) in an array of storage devices according to embodiments of the present invention. The example method depicted in FIG. 6 is similar to the example method depicted in FIG. 3, as the example method depicted in FIG. 6 also includes retrieving (304) control information (322) describing the state of one or more memory blocks (318, 320) in the storage device (316), receiving (305) a request (300) to write data (301) to the storage device (316), and performing (306) a storage device management operation.

In the example method depicted in FIG. 6, the control information (322) includes information (602) identifying a plurality of memory dies and a range of memory addresses associated with each memory die. The storage device (316) depicted in FIG. 6 may be comprised of many memory dies, each of which may associated with a range of addresses within the storage device (316). As such, the information (602) identifying a plurality of memory dies and a range of memory addresses associated with each memory die may include an identifier for each memory die as well as a range of memory addresses that are associated with the particular memory die.

In the example method depicted in FIG. 6, performing (306) the storage device management operation can include identifying (604) a target memory block on the storage device (316), including selecting a target memory die. Selecting a memory channel may be carried out to facilitate parallel accesses of the storage device (316) as only one memory access operation directed to a particular memory die may be serviced at a given point in time. In such a way, by directing memory access operations to different memory dies, multiple memory access operations may be carried out simultaneously. Selecting a target memory die may be carried out, for example, by selecting a memory die that is not currently being used to service a memory access request, by selecting a memory die that was least recently used to service a memory access request, and so on. Once a memory die has been selected, a memory address that is associated with the selected die may be identified (604) as the target memory block on the storage device (316) for servicing the request (300) to write data (301) to the storage device (316). A request (312) may therefore be sent (310) from the storage array controller (302) to the storage device (316) via the selected memory channel, requesting that the storage device (316) write the data (301) to the target memory block (314) identified (604) by the storage array controller (302).

Figure 7:
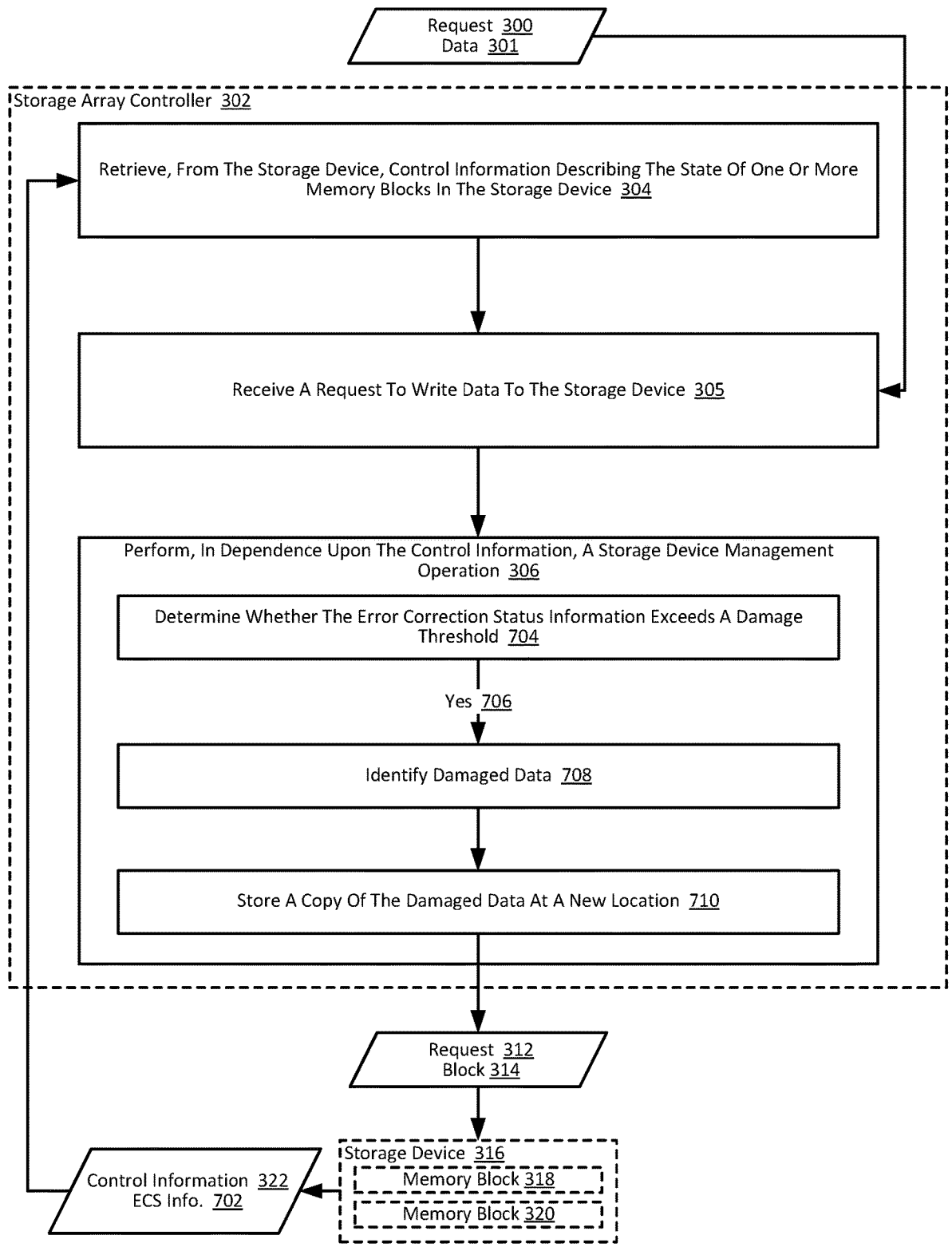
FIG. 7 sets forth a flow chart illustrating an additional example method for offloading device management responsibilities from a storage device in an array of storage devices according to embodiments of the present invention.

For further explanation, FIG. 7 sets forth a flow chart illustrating an example method for offloading device management responsibilities from a storage device (316) in an array of storage devices according to embodiments of the present invention. The example method depicted in FIG. 7 is similar to the example method depicted in FIG. 3, as the example method depicted in FIG. 7 also includes retrieving (304) control information (322) describing the state of one or more memory blocks (318, 320) in the storage device (316), receiving (305) a request (300) to write data (301) to the storage device (316), and performing (306) a storage device management operation.

In the example method depicted in FIG. 7, the control information (322) includes error correction status information (702) for one or more memory blocks. The error correction status information (702) can include information describing the extent to which data stored in the storage device (316) contains errors. Such errors may occur, for example, as flash cells that are part of the storage device (316) begin to degrade, thereby causing the flash cells to lose their charge such that data is lost. In such an example, the error correction status information (702) can include an identification of memory blocks containing errors, the number of errors in those blocks, and other information that can enable the storage device (316) to tell the host computer when to schedule the rewriting of data before it becomes lost due to errors exceeding the ECC threshold, or tell the host to schedule RAID reconstruction of the data because the data has already crossed the ECC threshold and is now unreadable on the storage device (316).

In the example method depicted in FIG. 7, performing (306) the storage device management operation can include determining (704) whether the error correction status information exceeds a damage threshold. As described above, the storage device (316) may be able to reconstruct lost data through the use of error correction codes or other mechanisms. The ability to reconstruct lost data through the use of error correction codes or other mechanisms, however, is limited. For example, after a certain number of cells have gone bad and lost data, the lost data may not be reconstructed. A damage threshold may therefore exist that identifies, for example, the number of cells in a memory block that can lose data before the storage device (316) needs to reconstruct the data. Determining (704) whether the error correction status information exceeds a damage threshold may therefore be carried out, for example, by comparing the number of damaged cells in a memory block to the damage threshold to determine whether the data formerly contained in the damaged cells needs to be reconstructed.

In the example method depicted in FIG. 7, performing (306) the storage device management operation can also include identifying (708) damaged data and storing (710) a copy of the damaged data at a new location. In the example method depicted in FIG. 7, identifying (708) damaged data and storing (710) a copy of the damaged data at a new location is carried out responsive to affirmatively (706) determining that the error correction status information exceeds the damage threshold. Identifying (708) damaged data and storing (710) a copy of the damaged data at a new location may be carried out, for example, by reconstructing the damaged data and storing the reconstructed data in a new location within the storage device (316).

Although the examples described above, particularly with reference to FIGS. 3-7, described embodiments where control information only includes a bad block list, control information only includes P/E counts, control information only includes memory channel information, control information only includes memory die information, and control information only includes error correction status information, such embodiments are only included for ease of explanation and in no way are exclusive embodiments. That is, embodiments are contemplated where the control information includes a bad block list, P/E counts, memory channel information, memory die information, and error correction status information. In such embodiments, performing a storage device management operation may be carried out by taking all of the control information into account. For example, target memory blocks may be selected that are not on the bad block list, that have low P/E counts, and that are coupled to an unused memory channel or located on a currently unused memory die. Readers will appreciate that embodiments are contemplated that include the usage of any combination of the control information described above, as well as other forms of control information not explicitly recited herein.

Example embodiments of the present invention are described largely in the context of a fully functional computer system. Readers of skill in the art will recognize, however, that the present invention also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
sending, by a storage system controller to a storage device, a request to find control information for the storage device, the storage system controller being external to the storage device;
receiving, by the storage system controller from the storage device, one or more locations of one or more memory blocks that include the control information, wherein the control information for the storage device includes state information for the storage device; and
retrieving, by the storage system controller from the storage device, the control information from one or more memory blocks whose location was identified by the storage device for the storage system controller.

2. The method of claim 1 further comprising performing, in dependence upon the control information, a storage device management operation.

3. The method of claim 2 further comprising receiving a request to write data to the storage device, wherein:
the control information includes a bad block list, the bad block list including information describing memory blocks on the storage device that have failed; and
performing the storage device management operation includes:
identifying a target memory block on the storage device that is not on the bad block list; and
sending a request to write the data to the target memory block.

4. The method of claim 2 further comprising receiving a request to write data to the storage device, wherein:
- the control information includes a program-erase ('P/E') count for each memory block, the P/E count including information describing a number of times that data has been written to and erased from a particular memory block; and
- performing the storage device management operation includes:
- identifying a target memory block on the storage device that is associated with a lowest P/E count; and
- sending a request to write the data to the target memory block.

5. The method of claim 2 further comprising receiving a request to write data to the storage device, wherein:
- the control information includes information identifying a plurality of memory access channels and a range of memory addresses associated with each memory access channel; and
- performing the storage device management operation includes:
- identifying a target memory block on the storage device, including selecting a memory channel; and
- sending a request to write the data to the target memory block.

6. The method of claim 2 further comprising receiving a request to write data to the storage device, wherein:
- the control information includes information identifying a plurality of memory dies and a range of memory addresses associated with each memory die; and
- performing the storage device management operation includes:
- identifying a target memory block on the storage device, including selecting a target memory die; and
- sending a request to write the data to the target memory block.

7. The method of claim 2 wherein:
- the control information includes error correction status information for one or more memory blocks; and
- performing the storage device management operation includes:
- determining whether the error correction status information exceeds a damage threshold; and
- responsive to determining that the error correction status information exceeds the damage threshold:
- identifying damaged data; and
- storing a copy of the damaged data at a new location.

8. The method of claim 1 wherein the storage system controller is coupled with a plurality of storage devices and each storage device is coupled for data communications with the storage system controller over one or more data communications fabrics, wherein the storage device includes a storage device controller.

9. A storage system controller that is coupled for data communications with a plurality of storage devices, the storage system controller including a computer processor and a computer memory, the computer memory including computer program instructions that, when executed, cause the storage system controller to carry out the steps of:
- sending, by the storage system controller to a storage device, a request to find control information for the storage device, the storage system controller being external to the storage device;
- receiving, by the storage system controller from the storage device, one or more locations of one or more memory blocks that include the control information, wherein the control information for the storage device includes state information for the storage device; and
- retrieving, by the storage system controller from the storage device, the control information from one or more memory blocks whose location was identified by the storage device for the storage system controller.

10. The storage system controller of claim 9 further comprising computer program instructions that, when executed, cause the storage system controller to carry out a step of performing, in dependence upon the control information, a storage device management operation.

11. The storage system controller of claim 10 further comprising computer program instructions that, when executed, cause the storage system controller to carry out a step of receiving a request to write data to the storage device, wherein:
- the control information includes a bad block list, the bad block list including information describing memory blocks on the storage device that have failed; and
- performing the storage device management operation includes:
- identifying a target memory block on the storage device that is not on the bad block list; and
- sending a request to write the data to the target memory block.

12. The storage system controller of claim 10 further comprising computer program instructions that, when executed, cause the storage system controller to carry out a step of receiving a request to write data to the storage device, wherein:
- the control information includes a program-erase ('P/E') count for each memory block, the P/E count including information describing a number of times that data has been written to and erased from a particular memory block; and
- performing the storage device management operation includes:
- identifying a target memory block on the storage device that is associated with a lowest P/E count; and
- sending a request to write the data to the target memory block.

13. The storage system controller of claim 10 further comprising computer program instructions that, when executed, cause the storage system controller to carry out a step of receiving a request to write data to the storage device, wherein:
- the control information includes information identifying a plurality of memory access channels and a range of memory addresses associated with each memory access channel; and
- performing the storage device management operation includes:
- identifying a target memory block on the storage device, including selecting a memory channel; and
- sending a request to write the data to the target memory block.

14. The storage system controller of claim 10 further comprising computer program instructions that, when executed, cause the storage system controller to carry out a step of receiving a request to write data to the storage device, wherein:
- the control information includes information identifying a plurality of memory dies and a range of memory addresses associated with each memory die; and
- performing the storage device management operation includes:

identifying a target memory block on the storage device, including selecting a target memory die; and sending a request to write the data to the target memory block.

15. The storage system controller of claim 10 further comprising computer program instructions that, when executed, cause the storage system controller to carry out a step of receiving a request to write data to the storage device, wherein:

the control information includes error correction status information for one or more memory blocks; and performing the storage device management operation includes:

determining whether the error correction status information exceeds a damage threshold; and responsive to determining that the error correction status information exceeds the damage threshold:

identifying damaged data; and storing a copy of the damaged data at a new location.

16. The storage system controller of claim 9 wherein each storage device is coupled for data communications with the storage system controller over one or more data communications fabrics, wherein the storage device includes a storage device controller.

17. A computer program product disposed on a non-transitory computer readable medium, the computer program product including computer program instructions that, when executed, cause a computer to carry out the steps of:

sending, by a storage system controller to a storage device, a request to find control information for the storage device, the storage system controller being external to the storage device;

receiving, by the storage system controller from the storage device, one or more locations of one or more memory blocks that include the control information, wherein the control information for the storage device includes state information for the storage device; and retrieving, by the storage system controller from the storage device, the control information from one or more memory blocks whose location was identified by the storage device for the storage system controller.

18. The computer program product of claim 17 further comprising computer program instructions that, when executed, cause a computer to carry out a step of performing, in dependence upon the control information, a storage device management operation.

19. The computer program product of claim 18 further comprising computer program instructions that, when executed, cause a computer to carry out a step of receiving a request to write data to the storage device, wherein:

the control information includes a bad block list, the bad block list including information describing memory blocks on the storage device that have failed; and performing the storage device management operation includes:

identifying a target memory block on the storage device that is not on the bad block list; and sending a request to write the data to the target memory block.

20. The computer program product of claim 18 further comprising computer program instructions that, when executed, cause a computer to carry out a step of receiving a request to write data to the storage device, wherein:

the control information includes a program-erase ('P/E') count for each memory block, the P/E count including information describing a number of times that data has been written to and erased from a particular memory block; and performing the storage device management operation includes:

identifying a target memory block on the storage device that is associated with a lowest P/E count; and sending a request to write the data to the target memory block.

* * * * *